US010073636B2

(12) United States Patent
Khochare et al.

(10) Patent No.: US 10,073,636 B2
(45) Date of Patent: Sep. 11, 2018

(54) TECHNOLOGIES FOR CONTEMPORANEOUS ACCESS OF NON-VOLATILE AND VOLATILE MEMORY IN A MEMORY DEVICE

(71) Applicant: Intel Corporation, Santa Clara, CA (US)

(72) Inventors: Kunal A. Khochare, Folsom, CA (US); Camille C. Raad, Folsom, CA (US); Richard P. Mangold, Forest Grove, OR (US); Shachi K. Thakkar, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/975,160

(22) Filed: Dec. 18, 2015

(65) Prior Publication Data

US 2017/0177244 A1    Jun. 22, 2017

(51) Int. Cl.
*G06F 12/00* (2006.01)
*G06F 3/06* (2006.01)
*G06F 12/02* (2006.01)

(52) U.S. Cl.
CPC .......... *G06F 3/0619* (2013.01); *G06F 3/0611* (2013.01); *G06F 3/0659* (2013.01);
(Continued)

(58) Field of Classification Search
CPC .... G06F 3/0619; G06F 3/0611; G06F 3/0688; G06F 3/0685; G06F 3/0659; G06F 12/0246
(Continued)

(56) References Cited

U.S. PATENT DOCUMENTS

2002/0185337 A1* 12/2002 Miura ...................... G11O 5/02
                                                                      185/11
2007/0091678 A1*  4/2007 Kato ................... G06F 11/1068
                                                                     365/185.09
(Continued)

FOREIGN PATENT DOCUMENTS

WO       2010078540        7/2010

OTHER PUBLICATIONS

International search report for PCT application No. PCT/US2016/062774, dated Feb. 27, 2017 (11 pages).
(Continued)

*Primary Examiner* — Tuan Thai
*Assistant Examiner* — Tasnima Matin
(74) *Attorney, Agent, or Firm* — Barnes & Thornburg LLP

(57) ABSTRACT

Technologies for accessing memory devices of a memory module device includes receiving a memory read request form a host and reading, in response to the memory read request, a rank of active non-volatile memory devices of the memory module device while contemporaneously accessing a volatile memory device of the memory module device. The volatile memory device shares data lines of a data bus of the memory module device with a spare non-volatile memory device associated with the rank of active non-volatile memory devices. During write operations, each of the rank of active non-volatile memory devices and the spare non-volatile memory device associated with the rank of active non-volatile memory devices are written to facilitate proper wear leveling of the non-volatile memory devices. The spare non-volatile memory device may replace a failed non-volatile memory devices of the rank of active non-volatile memory devices. In such an event, the volatile memory device is no longer contemporaneously accessed during read
(Continued)

operations of the rank of active non-volatile memory devices.

16 Claims, 7 Drawing Sheets

(52) U.S. Cl.
CPC .......... *G06F 3/0685* (2013.01); *G06F 3/0688* (2013.01); *G06F 12/0246* (2013.01)

(58) Field of Classification Search
USPC ........................................................ 711/103
See application file for complete search history.

(56) References Cited

U.S. PATENT DOCUMENTS

| | | | |
|---|---|---|---|
| 2008/0235443 | A1 | 9/2008 | Chow et al. |
| 2008/0266962 | A1* | 10/2008 | Jeon ..................... G11C 16/349 365/185.12 |
| 2009/0172253 | A1 | 7/2009 | Rothman et al. |
| 2010/0332730 | A1 | 12/2010 | Royer, Jr. et al. |
| 2011/0153903 | A1* | 6/2011 | Hinkle .................... G06F 13/20 710/313 |
| 2012/0131262 | A1* | 5/2012 | He ..................... G06F 12/0246 711/103 |
| 2012/0191927 | A1 | 7/2012 | Gorobets et al. |
| 2014/0369138 | A1 | 12/2014 | Balluchi et al. |

OTHER PUBLICATIONS

Written opinion for PCT application No. PCT/US2016/062774, dated Feb. 27, 2017 (5 pages).

\* cited by examiner

TECHNOLOGIES FOR CONTEMPORANEOUS ACCESS OF NON-VOLATILE AND VOLATILE MEMORY IN A MEMORY DEVICE

BACKGROUND

Memory devices, such as memory integrated circuits, are used to store data. Memory devices may be embodied as non-volatile memory in which the data is stored in a persistent manner or as volatile memory in which the data is stored until removal of power from the memory device. Oftentimes, memory devices form a sub-component of a larger computing system or electrical device. For example, memory devices may be incorporated in computers, solid state drives, portable memory systems, and/or the like.

Memory module devices provide larger memory capacity by incorporating multiple memory devices into a single package, board, or component. Memory module devices may include non-volatile memory devices and/or volatile memory devices in a single module. The various memory devices of a memory module device may be arranged into multiple groups or ranks of memory devices to provide a larger address space and overall memory capacity for the memory module device.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
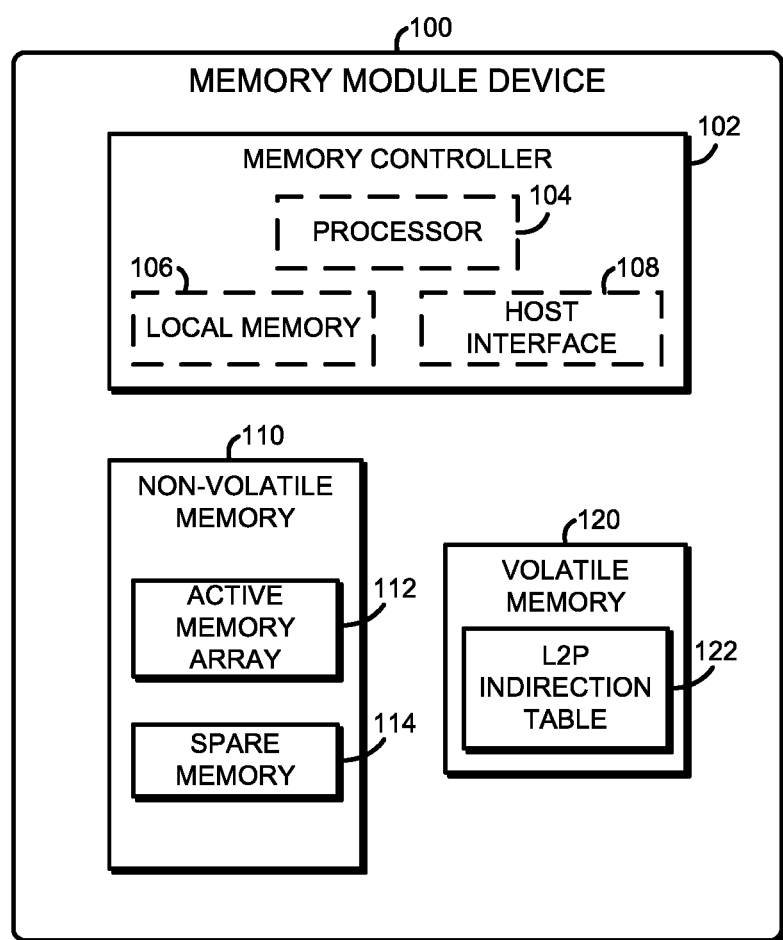
FIG. 1 is a simplified block diagram of a memory module device for contemporaneous access of non-volatile and volatile memory.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

As shown in FIG. 1, an illustrative memory module device 100 includes a memory controller 102, a non-volatile memory 110, and a volatile memory 120. The non-volatile memory 110 includes an active memory array 112 and spare memory 114. The active memory array 112 includes multiple memory devices that are "active," i.e., they are presently used by the memory controller 102 to actively store and retrieve data. Conversely, the spare memory 114 includes a number of memory devices that are "inactive," i.e., they are not presently used by the memory controller 102 to actively store and retrieve data (although some data may be written to the spare memory devices of the spare memory 114 for wear leveling purposes). As discussed in more detail below, should a memory device of the active memory array 112 fail, a corresponding memory device of the spare memory 114 may be used in its place.

The volatile memory 120 is used by the memory controller 102 to store various data during operation of the memory module device 100, such as metadata associated with the non-volatile memory 110. For example, in the illustrative embodiment, the memory controller 102 temporarily stores and manages a logical-to-physical indirection table 122 in the volatile memory 120 during operation of the memory module device 100. Illustratively, the logical-to-physical indirection table 122 correlates logical addresses associated with the non-volatile memory 110 to the corresponding physical addresses of the non-volatile memory 110. Of course, the memory controller 102 may store and access additional data in the volatile memory 120 in other embodiments. As such, during operation of the memory module device 100, the memory controller 102 may periodically, continually, and/or responsively access the volatile memory 120.

Figure 2:
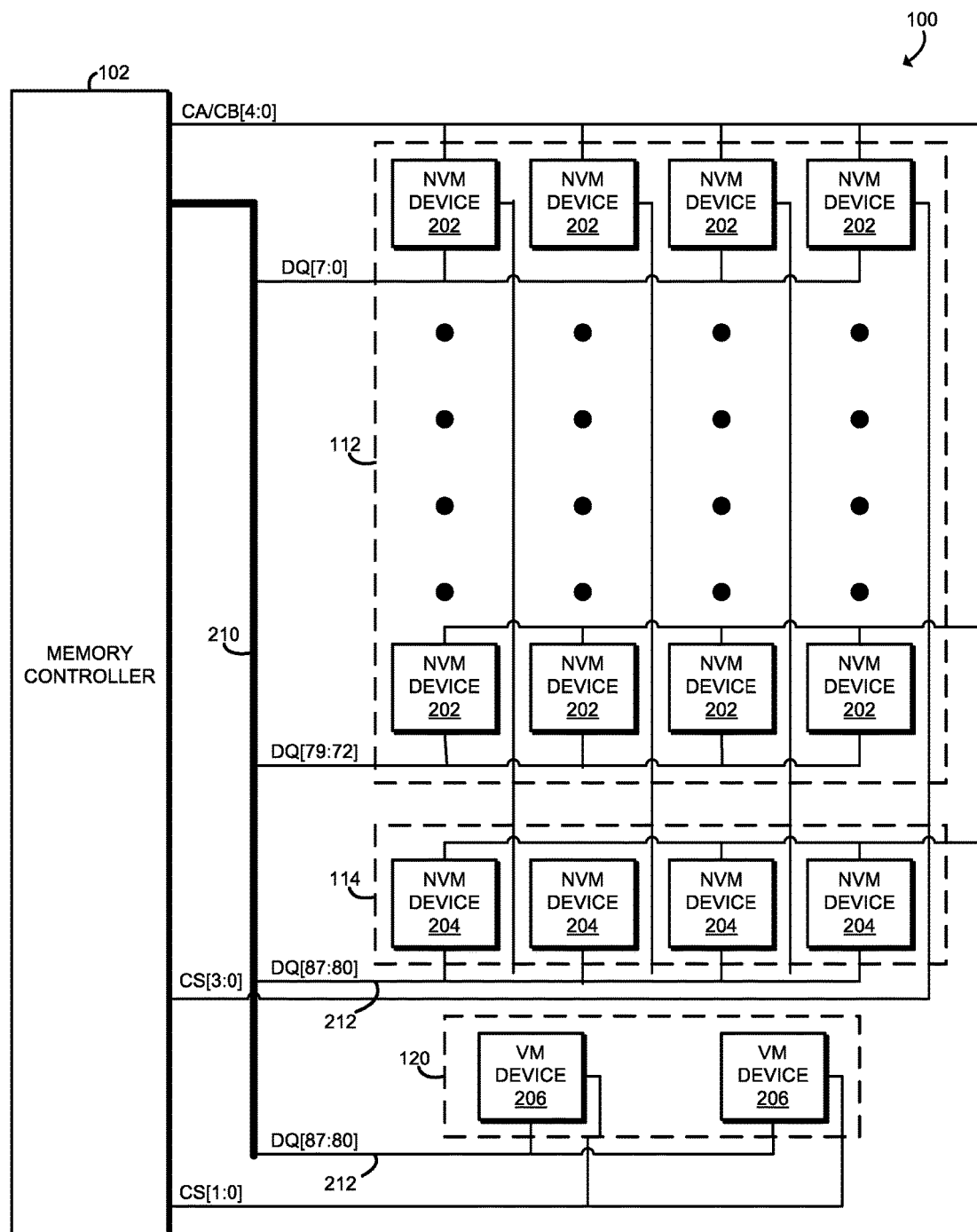
FIG. 2 is a simplified block diagram of various interconnections of memory device components of the memory module device of FIG. 1.

An illustrative embodiment of the active memory array 112, the spare memory 114, and the volatile memory 120 of the memory module device 100 is shown in FIG. 2. The active memory array 112 includes multiple active non-volatile memory devices 202 arranged in individual columns or ranks. Each rank of active non-volatile memory devices 202 is communicatively coupled to the memory controller 102 via a data bus 210. That is, each active non-volatile memory device 202 of a particular rank is communicatively coupled to the memory controller 102 via a corresponding set of data bus links (e.g., the top tier non-volatile memory devices 202 is communicatively coupled to the memory controller 102 via data bus links DQ[7:0]). Of course, the memory module device 100 also includes additional command interconnections (e.g., column select lines) between the memory controller 102 and each memory device of the non-volatile memory 110 and volatile memory 120, only some of which are shown in FIG. 2 for clarity of that figure. Additionally, although the illustrative active memory array 112 of FIG. 2 includes four ranks of ten active non-volatile memory devices 202 each, the active memory array 112 may include additional or fewer ranks of greater or fewer active non-volatile memory devices 202 in other embodiments depending on, for example, the memory capacity of the memory module device 100.

The illustrative spare memory 114 of the memory module device 100 includes a spare non-volatile memory device 204 associated with each rank of active non-volatile memory devices 202. For example, as shown in FIG. 2, the spare memory 114 includes four spare non-volatile memory devices 204, one for each of the illustrative four ranks of active non-volatile memory devices 202. Similar to the active non-volatile memory device 202, the spare non-volatile memory devices 204 of the spare memory 114 are communicatively coupled to the memory controller 102 via a set of data bus lines 212 of the data bus 210 (e.g., illustratively, data lines DQ[87:80].)

The illustrative volatile memory 120 includes a number of volatile memory devices 206, which store various data during operation of the memory module device 100 as discussed above. For example, as shown in FIG. 2, the volatile memory 120 includes two volatile memory devices 206, but may include additional or fewer volatile memory devices 206 in other embodiments. Each of the volatile memory devices 206 is communicatively coupled to the memory controller 102 via the same set of data bus lines 212 as the spare non-volatile memory devices 204 of the spare memory 114. As such, during operation, the memory controller 102 can access either the volatile memory devices 206 or the spare non-volatile memory devices, but not both, at a particular point in time.

As discussed above, in use, the memory controller 102 may periodically and/or repeatedly access the volatile memory 120. However, to reduce latency of memory accesses to the volatile memory 120 and lower overall power consumption of the memory module device 100, the memory controller 102 is configured to access the volatile memory 120 contemporaneously with reads from the active memory array 112 of the non-volatile memory 110. To do so, the memory controller 102 selects only the active non-volatile memory devices 202 of the addressed rank, and not the spare non-volatile memory device 204 associated with the addressed rank, for each read operation. As such, because the spare non-volatile memory devices 204 are not being accessed during the read operation, the data bus lines 212 coupled to both the spare non-volatile memory devices 204 of the spare memory 114 and the volatile memory devices 206 of the volatile memory 120 are used to access (e.g., read and/or write) the volatile memory devices 206 during the read operation of the active non-volatile memory devices 202. By accessing the volatile memory devices 206 during the read operation of the active non-volatile memory devices 202, the latency of volatile memory accesses may be reduced. Additionally, because the spare non-volatile memory devices 204 are not accessed during the read operations of the active non-volatile memory devices 202, the overall power consumption of the memory module device 100 may be reduced. To facilitate proper wear leveling across the various memory devices 202, 204, the memory controller 102 is configured to write to each of the active non-volatile memory devices 202 of a selected rank and the spare non-volatile memory device 204 associated with the selected rank during a write operation.

Referring back to FIG. 1, the memory controller 102 of the memory module device 100 may be embodied as any type of control device, circuitry, or collection of hardware devices capable of reading, writing, and managing the non-volatile memory 110 and the volatile memory 120. In the illustrative embodiment, the memory controller 102 includes a processor 104, a local memory 106, and a host interface 108. Of course, the memory controller 102 may include additional devices, circuits, and/or components commonly found in a memory controller of a memory module device in other embodiments.

The processor 104 may be embodied as any type of processor capable of performing the functions described herein. For example, the processor 104 may be embodied as a single or multi-core processor(s), digital signal processor, microcontroller, or other processor or processing/controlling circuit. Similarly, the local memory 106 may be embodied as any type of volatile and/or non-volatile memory or data storage capable of performing the functions described herein. In the illustrative embodiment, the local memory 106 stores firmware and/or other instructions executable by the processor 104 to perform the described functions of the memory controller 102. In some embodiments, the processor 104 and the local memory 106 may form a portion of a System-on-a-Chip (SoC) and be incorporated, along with other components of the memory controller 102, onto a single integrated circuit chip.

The host interface 108 may also be embodied as any type of hardware processor, processing circuitry, input/output circuitry, and/or collection of components capable of facilitating communication of the memory module device 100 with a host device or service (e.g., a host application). That is, the host interface 108 embodies or establishes an interface for accessing data stored on the memory module device 100 (e.g., stored in the non-volatile memory 110 or the volatile memory 120). To do so, the host interface 108 may be configured to utilize any suitable communication protocol and/or technology to facilitate communications with the memory module device 100.

In the illustrative embodiment, the memory module device 100 is embodied as a non-volatile dual in-line memory module (NVDIMM), but may be embodied as any other type of memory module capable of performing the functions described herein in other embodiments. Additionally, each of the active non-volatile memory devices 202 and the spare non-volatile memory devices 204 of the non-volatile memory 110 are illustratively embodied as bit-addressable, write-in-place non-volatile memory devices, such as three-dimensional (3D) crosspoint memory or other types of bit addressable, write-in-place non-volatile memory, such as ferroelectric random-access memory (FeTRAM), nanowire-based non-volatile memory, phase change memory (PCM), memory that incorporates memristor technology, Magnetoresistive random-access memory (MRAM) or Spin Transfer Torque (STT)-MRAM. Similarly, the volatile memory devices 206 of the volatile memory 120 are illustratively embodied as dynamic random-access memory (DRAM) devices, but may be embodied as other types of volatile memory devices and/or memory technologies capable of storing data while the memory module device 100 is operational such as DDR4 (DDR version 4, initial specification published in September 2012 by JEDEC), DDR4E (in development by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5 (currently in discussion by JEDEC), HBM2 (HBM version 2), currently in discussion by JEDEC), and/or others, and technologies based on derivatives or extensions of such specifications.

Figure 3:
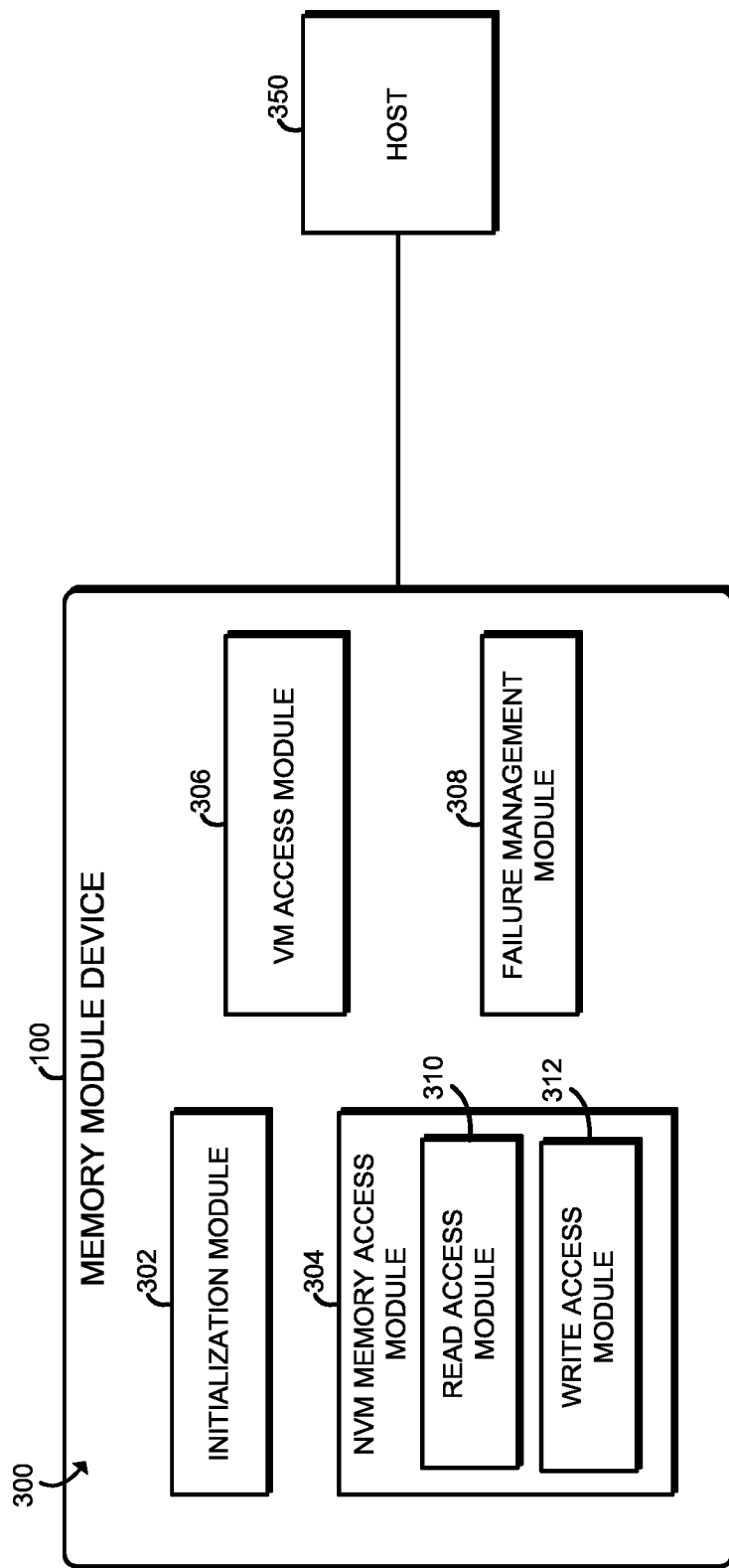
FIG. 3 is a simplified block diagram of an environment that may be established by the memory module device of FIG. 1.

Referring now to FIG. 3, in use, the memory module device 100 may establish an environment 300. The illustrative environment 300 includes an initialization module 302, a non-volatile memory access module 304, a volatile memory access module 306, and a failure management module 308. Of course, the environment 300 may include additional or other modules in other embodiments. Each of the modules and other components of the environment 300 may be embodied as firmware, software, hardware, or a combination thereof. For example the various modules, logic, and other components of the environment 300 may form a portion of, or otherwise be established by, the memory controller 102 or other hardware components of the memory module device 100. As such, in some embodiments, any one or more of the modules of the environment 300 may be embodied as a circuit or collection of electrical devices (e.g., an initialization circuit 302, a non-volatile memory access circuit 304, a volatile memory access circuit 306, a failure management circuit 308, etc.).

The initialization module 302 is configured to initialize the various non-volatile memory devices 202, 204 of the non-volatile memory 110 by setting an assignable identification value of each of the memory devices 202, 204. That is, each of the illustrative active non-volatile memory devices 202 and the spare non-volatile memory devices 204 includes an assignable identification value, a master identification value, and a selection identification value. The assignable identification value is assignable during operation of the memory module device 100 and typically resets upon each power cycle of the memory module device 100. The master identification value may be set to a default value by the manufacturer of the memory module device 100 and is persistent across power cycles. Additionally, the master identification value overrides the assignable identification value of the corresponding non-volatile memory device 202, 204. The selection identification value is also settable during operation of the memory module device 100 and determines which non-volatile memory device 202, 204 will respond to a memory access command (e.g., a read or write command). That is, each non-volatile memory device 202, 204 will respond to a memory access command from the memory controller 102 if its corresponding selection identification value matches its assignable identification value. However, if the selection identification value matches its master identification value, the corresponding non-volatile memory device 202, 204 will respond to a memory access command regardless of its present assignable identification value (i.e., the master identification value overrides the assignable identification value).

As discussed above, during an initialization process of the memory module device 100 (see, e.g., method 400 of FIG. 4), the initialization module 302 sets the assignable identification value of the active non-volatile memory devices 202 and the spare non-volatile memory devices 204. In the illustrative embodiment, the initialization module 302 sets the assignable identification value of each of the active non-volatile memory devices 202 to a common value and sets the assignable identification value of each of the spare non-volatile memory devices 204 to a unique value (i.e., a value different from the common value of the active non-volatile memory devices 202). The master identification value of each of the active non-volatile memory devices 202 and the spare non-volatile memory devices 204 may be left at the default value or otherwise set to the same value (but different from the common value). In this way, each of the active non-volatile memory devices 202 of a particular rank may be accessed, without accessing the associated spare non-volatile memory device 204, by setting the selection identification value of each of the non-volatile memory devices 202, 204 to the common value. Because the assignable identification value of the associated spare non-volatile memory device 204 is not equal to the common value, the associated spare non-volatile memory device 204 will not respond to any memory access command under such conditions. Alternatively, each of the active non-volatile memory devices 202 of a particular rank and the associated spare non-volatile memory device 204 may be accessed by setting the selection identification value of the non-volatile memory devices 202, 204 to the value of the master identification value.

The initialization module 302 may be configured to set the assignable identification values automatically or autonomously in some embodiments. Additionally or alternatively, in some embodiments, the initialization module 302 may provide a user interface to a host 350 (e.g., a host application or device) to facilitate user-customization of the assignable identification values of the non-volatile memory devices 202, 204.

The non-volatile memory access module 304 is configured to access the non-volatile memory 110 based on access requests received from the host 350. To do so, the illustrative non-volatile memory access module 304 includes a read access module 310 and a write access module 312. The read access module 310 is configured to respond to read requests from the host 350 by setting the selection identification value of each of the non-volatile memory devices 202, 204 to the value of the assignable identification value of the active non-volatile memory devices 202 (i.e., the common value). The read access module 310 may subsequently issue a read command to the non-volatile memory 110 to read the data contents from the addressed rank of active non-volatile memory devices 202. However, because the assignable identification value of the associated spare non-volatile memory device 204 is different, the associated spare non-volatile memory device 204 will not respond to the read command.

Similar to the read access module 310, the write access module 312 is configured to respond to write requests from the host 350. To do so, the write access module 312 sets the selection identification value of each of the non-volatile memory devices 202, 204 to the value of the master identification value of the non-volatile memory devices 202, 204. The write access module 312 may subsequently issue a write command to write data to each of the addressed rank of active non-volatile memory device 202, as well as the associated spare non-volatile memory device 204. In this way, a common wear leveling of the non-volatile memory devices 202, 204 is maintained.

The volatile memory access module 306 is configured to access the volatile memory 120 during read accesses to the active memory array 112. That is, the volatile memory access module 306 is configured to access the volatile memory devices 206 when the read access module 310 accesses the addressed rank of active non-volatile memory devices 202. Because the associated spare non-volatile memory device 204 does not respond to the read commands as discussed above, the data bus lines 212, which are communicatively coupled to each of the spare non-volatile memory devices 204 and the volatile memory devices 206, are free to be used to access the volatile memory devices 206. Of course, the volatile memory access module 306 may also access the volatile memory 120 at other times during which the non-volatile memory is not being accessed.

The failure management module 308 is configured to detect and respond to a failure of one or more of the active non-volatile memory devices 202. If a failed non-volatile memory device 202 of a particular rank is detected, the failure management module 308 is configured to migrate the data stored on the failed non-volatile memory device 202 to the associated spare non-volatile memory device 204. Of course, after a spare non-volatile memory device 204 is configured to replace a failed non-volatile memory device 202, the data bus lines 212 may not be used for the contemporaneous access of the volatile memory 120. As such, the failure management module 308 may subsequently disable the contemporaneous volatile memory access feature of the memory module device 100. For example, the failure management module 308 may instruct the non-volatile memory access module to use the master identification value for all future read and write accesses to the non-volatile memory 110.

Figure 4:
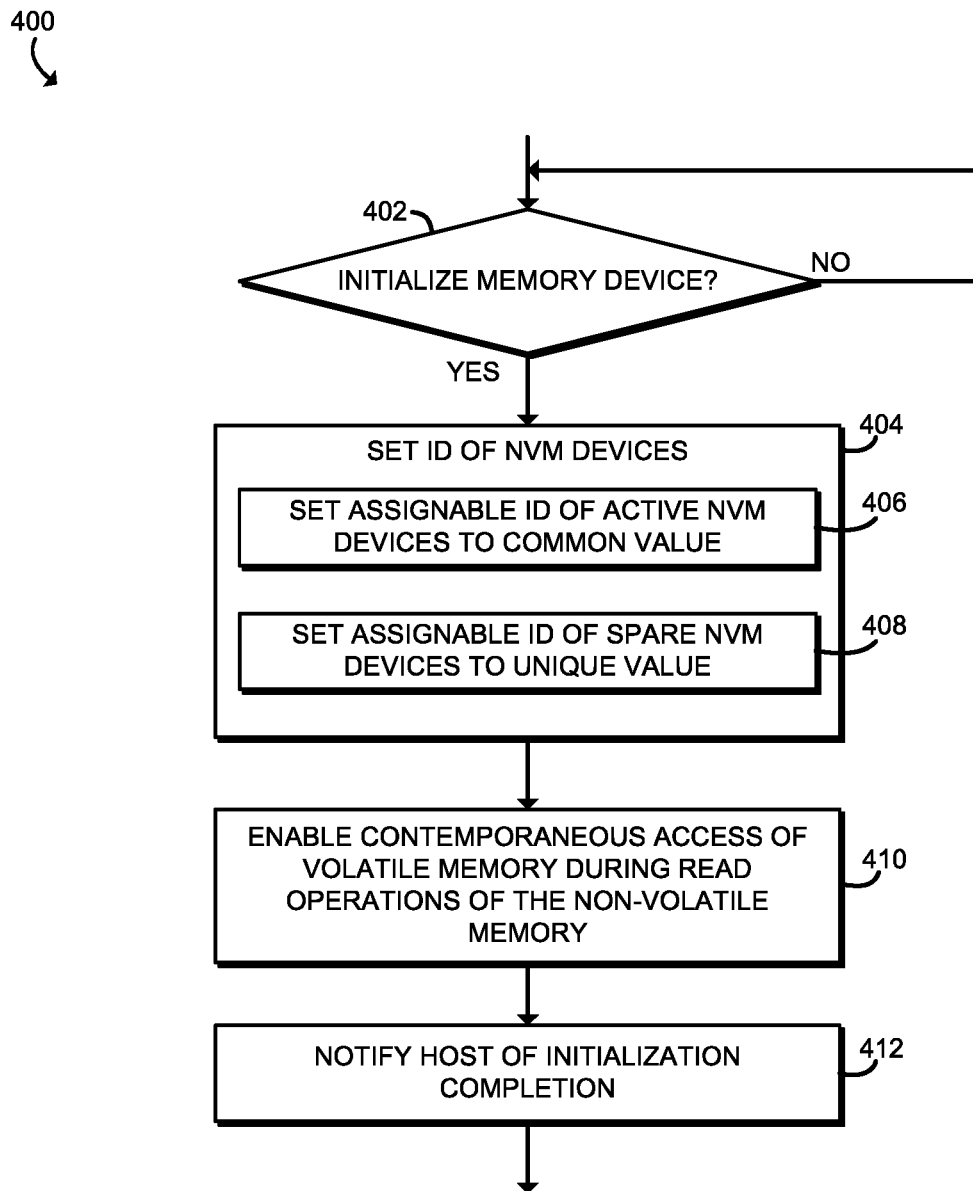
FIG. 4 is a simplified flow diagram of at least one embodiment of a method for initialization that may be executed by the memory module device of FIGS. 1-3.

Referring now to FIG. 4, in use, the memory controller 102 of the memory module device 100 may execute a method 400 for initializing the non-volatile memory 110. The method 400 begins with block 402 in which the memory controller 102 determines whether to initialize the non-volatile memory 110. In some embodiments, the memory controller 102 may be configured to initialize the non-volatile memory 110 upon each power-up cycle. Additionally or alternatively, as discussed above, the memory controller 102 may provide a user interface to the host 350 to facilitate user customization of the initialization of the non-volatile memory 110.

If the memory controller 102 determines to initialize the non-volatile memory 110, the method 400 advances to block 404 in which the memory controller 102 sets the assignable identification values of the non-volatile memory devices 202, 204. For example, in block 406, the memory controller 102 sets the assignable identification value of each active non-volatile memory device 202 to a common value. Additionally, in block 408, the memory controller 102 sets the assignable identification value of each spare non-volatile memory device 204 to a unique value (i.e., a value different form the common value).

Subsequently, in block 410, the memory controller 102 enables contemporaneous access of the volatile memory 120 during read operations of the volatile memory 120. For example, in some embodiments, the memory controller 102 may set a flag or bit of an associated register to indicate that contemporaneous access is enabled. In some embodiments, the flag or bit may be embodied as an unused or "spare" bit of an internal register of the memory controller 102. After the non-volatile memory 110 has been initialized in block 404 and 410, the memory controller 102 notifies the host that the initializations has been completed and the memory module device 100 is ready to receive memory access requests in block 412.

Figure 5:
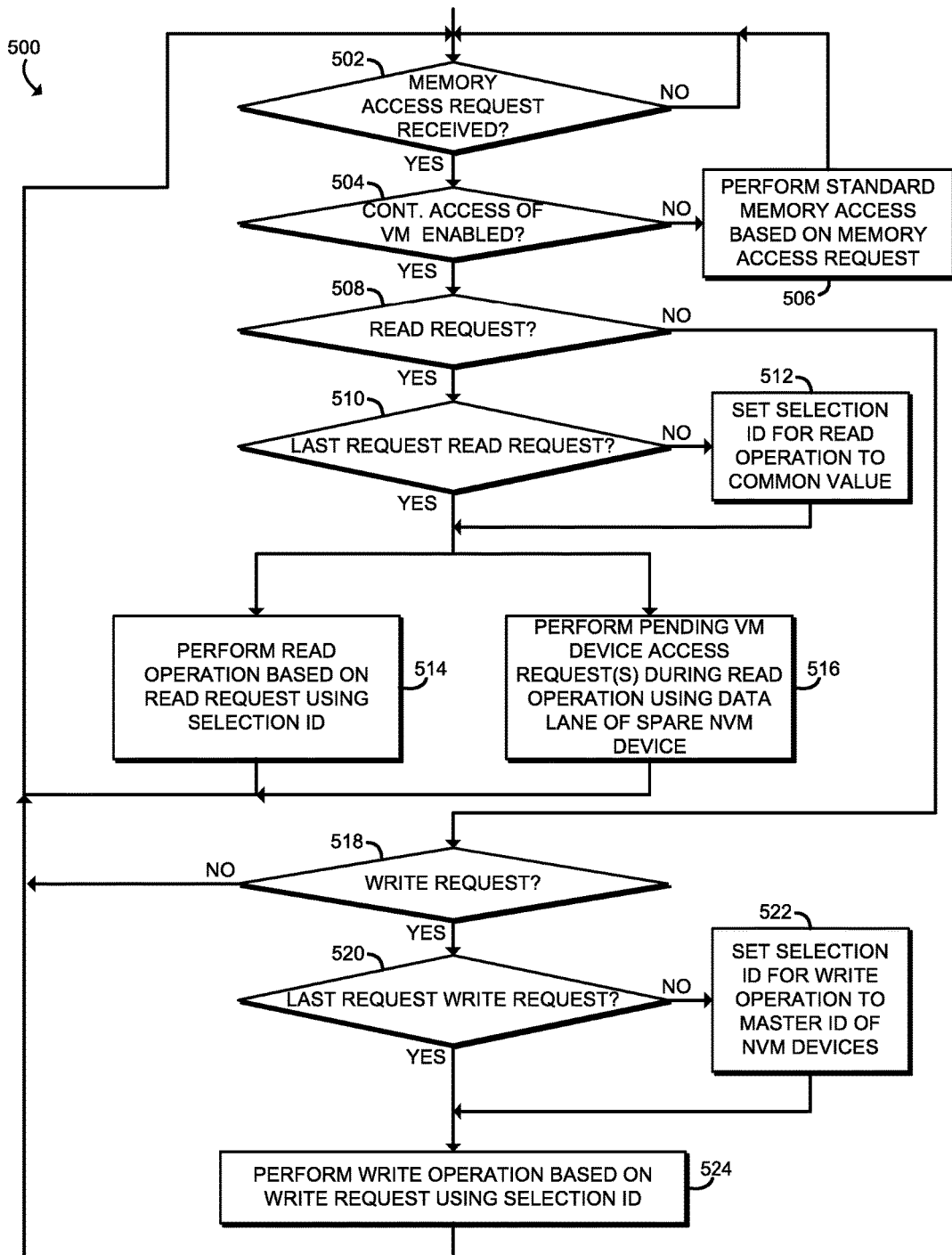
FIG. 5 is a simplified flow diagram of at least one embodiment of a method for contemporaneous access of non-volatile and volatile memory that may be executed by the memory module device of FIGS. 1-3.

Referring now to FIG. 5, in use, the memory controller 102 of the memory module device 100 may execute a method 500 for contemporaneously accessing the volatile memory 120 during read operations of the non-volatile memory 110. The method 500 begins with block 502 in which the memory controller 102 determines whether a memory access request has been received from the host 350. If so, the method 500 advances to block 504 in which the memory controller 102 determines whether contemporaneous access of the volatile memory 120 is enabled. As discussed above, in some embodiments, a bit or flag may be set to provide an indication that contemporaneous access of the volatile memory 120 during read operations of the non-volatile memory 110 is enabled. If the contemporaneous access of the volatile memory 120 is not enabled, the method 500 advances to block 506 in which the memory controller 102 performs a standard memory access based on the memory access request, and the method 500 subsequently loops back to block 502 in which the memory controller 102 continues to monitor for memory access requests from the host 350.

If, however, contemporaneous access of the volatile memory 120 is enabled, the method 500 advances to block 508. In block 508, the memory controller 102 determines whether the received memory access request is a read request. If so, the method 500 advances to block 510 in which the memory controller 102 determines whether the last request was also read request (i.e., whether the last access command issued by the memory controller 102 to the non-volatile memory 110 was a read command). If not, the method 500 advances to block 512 in which the memory controller 102 sets the selection identification value of each of the non-volatile memory devices 202, 204 to the common value to which each of the assignable identification values of the active non-volatile memory devices 202 were previously set. In this way, the memory controller 102 sets the selection identification value of the non-volatile memory devices 202, 204 only if the most previous memory access was a write access.

The method 500 subsequently advances to blocks 514 and 516. In block 514, the memory controller 102 performs a read operation on the non-volatile memory 110 by issuing a read command to the non-volatile memory devices 202, 204. Because the selection identification value matches the assignable identification value of the active non-volatile memory devices 202 of the addressed rank, each of the active non-volatile memory devices 202 respond to the issued read command. Conversely, because the selection identification value does not match the assignable identification value of spare non-volatile memory device 204 associated with the addressed rank, the spare non-volatile memory device 204 does not respond to the read command. As such, the data bus lines 212 are available to perform access operations with the volatile memory 120. Accordingly, in block 516 and contemporaneously with the read operation performed in block 514, the memory controller 102 performs any pending access requests to the volatile memory 120. For example, the memory controller 102 may read from and/or write to the volatile memory devices 206 in block 516 while reading from the active non-volatile memory devices 202 in block 514. The method 500 subsequently loops back to block 502 in which the memory controller 102 continues to monitor for memory access requests from the host 350.

Referring back to block 508, if the received memory access request is not a read request, the method 500 advances to block 518. In 518, the memory controller 102 determines whether the memory access request is a write request. If so, the method 500 advances to block 520 in which in which the memory controller 102 determines whether the last request was write request (i.e., whether the last access command issued by the memory controller 102 to the non-volatile memory 110 was a write command). If not, the method 500 advances to block 522 in which the memory controller 102 sets the selection identification value of each of the non-volatile memory devices 202, 204 to the value of the master identification value of each of the non-volatile memory devices 202, 204. In this way, the memory controller 102 sets the selection identification value of the non-volatile memory devices 202, 204 only if the most previous memory access was a read access.

The method 500 subsequently advances to block 524 in which the memory controller 102 performs a write operation to each of the non-volatile memory devices 202, 204 by issuing a write command. That is, because the selection identification of each of the non-volatile memory devices 202, 204 matches the master identification, each of the non-volatile memory devices 202, 204 responds to the write command regardless of their individual assignable identification value. The method 500 subsequently loops back to block 502 in which the memory controller 102 continues to monitor for memory access requests from the host 350.

Figure 6:
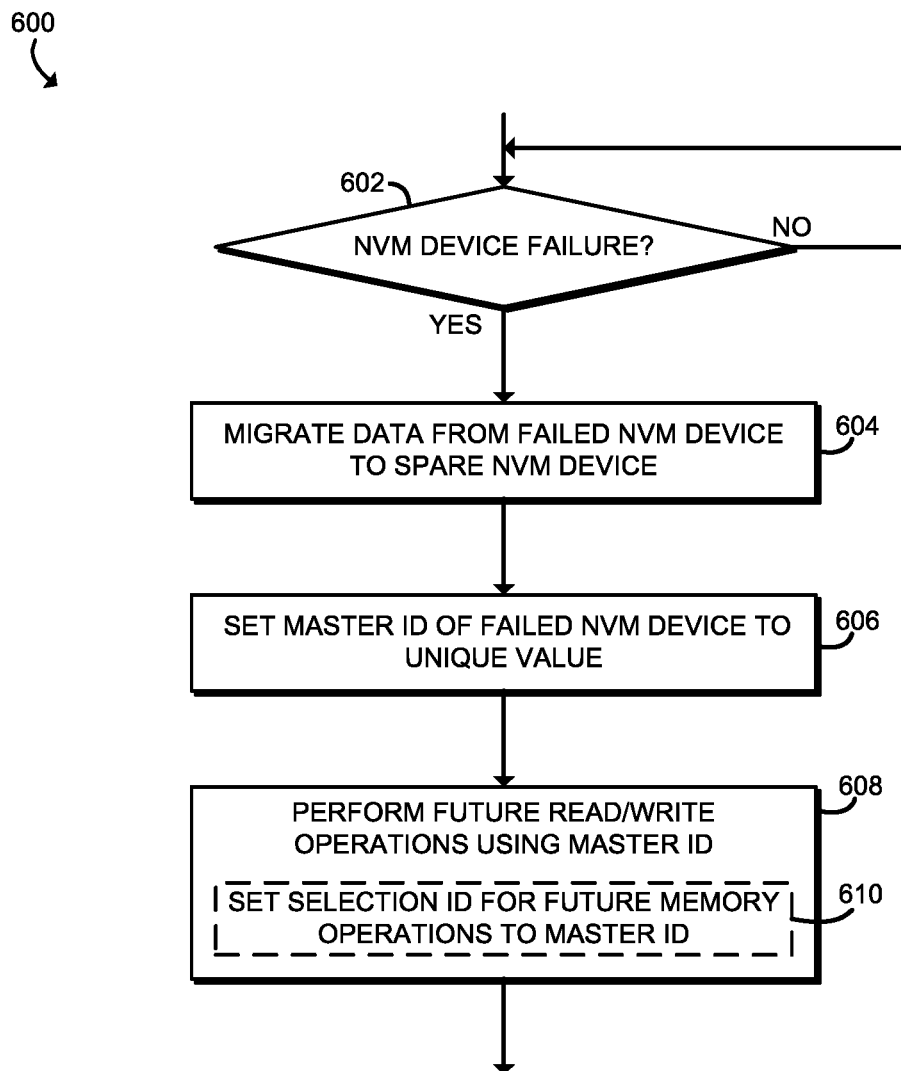
FIG. 6 is a simplified flow diagram of at least one embodiment of a method for handling a failure of a non-volatile memory device that may be executed by the memory module device of FIGS. 1-3.

Referring now to FIG. 6, in use, the memory controller 102 may also execute a method 600 for handling a failure of an active non-volatile memory device 202. The method 600 begins with block 602 in which the memory controller 102 determines whether an active non-volatile memory device 202 has failed. To do so, the memory controller 102 may utilize any suitable method and/or mechanism to determine such a device failure. If the memory controller 102 determines that an active non-volatile memory device 202 has failed, the method 600 advances to block 604. In block 604, the memory controller 102 migrates data from the failed active non-volatile memory device 202 to the associated spare non-volatile memory device 204. In block 606, the memory controller 102 sets the master identification value of the failed non-volatile memory device 202 to a unique value such that the failed non-volatile memory device 202 will not respond to future read or write commands from the memory controller 102. Additionally, in block 608, the memory controller 102 performs further read and write operations using the master identification value of the non-volatile memory devices 202, 204. To do so, as shown in block 610, the memory controller 102 may set the selection identification of each non-volatile memory device 202, 204 to the value of the master identification value prior to issuing the corresponding read or write command. In this way, the memory controller 102 may disable the contemporaneous access of the volatile memory 120 during read operations of the non-volatile memory 110 in response to failure of an active non-volatile memory device 202.

Figure 7:
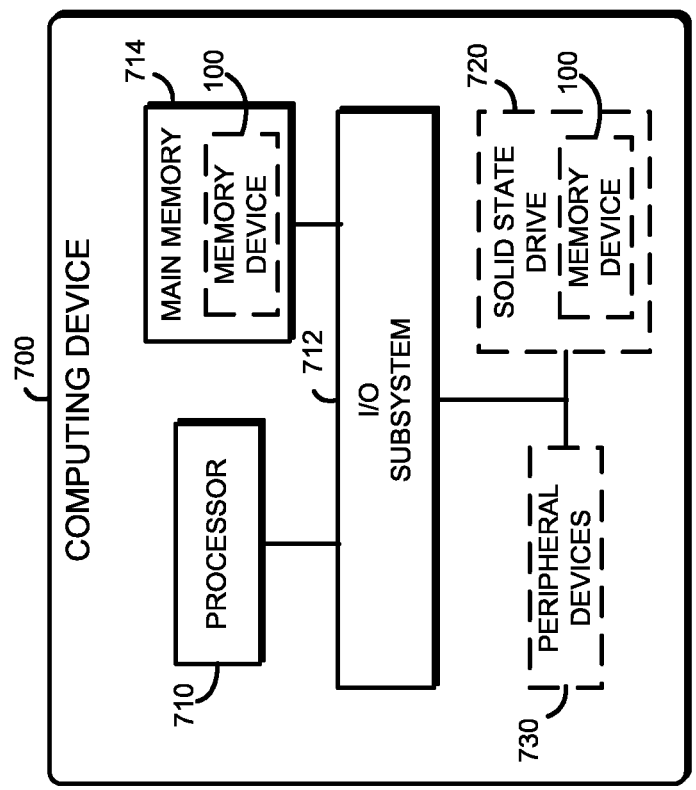
FIG. 7 is a simplified block diagram of at least one embodiment of a computing device including the memory module device of FIGS. 1-3.

Referring now to FIG. 7, in some embodiments, the memory module device 100 may be incorporated in, or form a portion of, a computing device 700. The computing device 700 may be embodied as any type of computing device in which the memory module device 100 may be used. For example, the computing device 700 may be embodied as a smart phone, a tablet computer, a notebook, a laptop computer, a netbook, an Ultrabook™, a wearable computing device, a pair of smart glasses, a head-mounted computing device, a cellular phone, a desktop computer, a smart device, a personal digital assistant, a mobile Internet device, a server, a data storage device, and/or any other computing/communication device. As shown in FIG. 7, the illustrative computing device 700 includes a processor 710, an input/output ("I/O") subsystem 712, and a main memory 714. Of course, the computing device 700 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 714, or portions thereof, may be incorporated in the processor 710 in some embodiments.

The processor 710 may be embodied as any type of processor capable of performing the functions described herein. For example, the processor 710 may be embodied as a single or multi-core processor(s), digital signal processor, microcontroller, or other processor or processing/controlling circuit. Similarly, the memory 714 may be embodied as any type of volatile or non-volatile memory or data storage capable of performing the functions described herein. In operation, the memory 714 may store various data and software used during operation of the computing device 700 such as operating systems, applications, programs, libraries, and drivers. The memory 714 is communicatively coupled to the processor 710 via the I/O subsystem 712, which may be embodied as circuitry and/or components to facilitate input/output operations with the processor 710, the memory 714, and other components of the computing device 700. For example, the I/O subsystem 712 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

In the illustrative embodiment, the main memory 714 includes the memory module device 100. However, in other embodiments, the memory module device 100 may form a portion of another device of the computing device 700. For example, in some embodiments, the computing device 700 may include a solid state drive 720 and/or other peripheral devices 730. In such embodiments, the memory module device 100 may be included in, or otherwise form a portion of, the solid state drive 720. Of course, in other embodiments, the memory module device 100 may be included in or form a portion of other components of the computing device 700.

Reference to memory devices can apply to different memory types, and in particular, any memory that has a bank group architecture. Memory devices generally refer to volatile memory technologies. Volatile memory is memory whose state (and therefore the data stored on it) is indeterminate if power is interrupted to the device. Nonvolatile memory refers to memory whose state is determinate even if power is interrupted to the device. Dynamic volatile memory requires refreshing the data stored in the device to maintain state. One example of dynamic volatile memory includes DRAM (dynamic random access memory), or some variant such as synchronous DRAM (SDRAM).

EXAMPLES

Illustrative examples of the technologies disclosed herein are provided below. An embodiment of the technologies may include any one or more, and any combination of, the examples described below.

Example 1 includes a memory module device for accessing memory, the memory module device comprising a rank of active non-volatile memory devices; a spare non-volatile memory device associated with the rank of active non-volatile memory devices; at least one volatile memory device; and a memory controller communicatively coupled to (i) the rank of active non-volatile memory devices via corresponding data bus lines of a data bus and (ii) to the spare non-volatile memory device and the volatile memory device by the same set of data bus lines of the data bus, and wherein the memory controller is to receive a memory read request from a host; read, via the data bus, the rank of active non-volatile memory devices in response to the memory read request; and access, via the set of data bus lines, the volatile memory device contemporaneously with the read of the rank of active non-volatile memory devices.

Example 2 includes the subject matter of Example 1, and wherein to read the rank of active non-volatile memory devices comprises to read the rank of active non-volatile memory devices while the spare non-volatile memory device associated with the rank of active non-volatile memory devices is not read.

Example 3 includes the subject matter of any of Examples 1 and 2, and wherein to access the volatile memory device comprises to read or write to the volatile memory device of the memory module device.

Example 4 includes the subject matter of any of Examples 1-3, and wherein the memory controller is further to set an assignable identification value of each of the active non-volatile memory devices of the rank of active non-volatile memory devices to a common value; and set an assignable identification value of the volatile memory device to a unique value.

Example 5 includes the subject matter of any of Examples 1-4, and wherein to read the rank of active non-volatile memory devices comprises to set a selection identification value of each of the active non-volatile memory devices and the spare non-volatile memory device associated with the rank of active non-volatile memory devices to the common value.

Example 6 includes the subject matter of any of Examples 1-5, and wherein to set the selection identification value of each of the active non-volatile memory devices and the spare non-volatile memory device associated with the rank of active non-volatile memory devices to the common value causes each of the active non-volatile memory devices to respond to a read command and the spare non-volatile memory device to ignore the read command.

Example 7 includes the subject matter of any of Examples 1-6, and wherein to set the selection identification value comprises to set the selection identification value of each of the active non-volatile memory devices and the spare non-volatile memory device associated with the rank of active non-volatile memory devices to the common value if the last memory access command issued to the rank of active non-volatile memory devices was a write command.

Example 8 includes the subject matter of any of Examples 1-7, and wherein to set the assignable identification value of each of the active non-volatile memory devices comprises to write the common value to a mode register of each of the active non-volatile memory devices, and set the assignable identification value of the volatile memory device comprises to write the unique value to a mode register of the volatile memory device.

Example 9 includes the subject matter of any of Examples 1-8, and wherein the memory controller is further to receive a memory write request from a host; and write to the rank of active non-volatile memory devices and the spare non-volatile memory device associated with the rank of active non-volatile memory devices in response to the memory write request.

Example 10 includes the subject matter of any of Examples 1-9, and wherein writing to the rank of active non-volatile memory devices and the spare non-volatile memory device associated with the rank of active non-volatile memory devices comprises to not access the volatile memory device contemporaneously with the writing to the rank of active non-volatile memory devices.

Example 11 includes the subject matter of any of Examples 1-10, and wherein each of the active non-volatile memory devices and the spare non-volatile memory device has a master identification value that is the same value, and wherein to write to the rank of active non-volatile memory devices and the spare non-volatile memory device comprises to set a selection identification value of each of the active non-volatile memory devices and the spare non-volatile memory device associated with the rank of active non-volatile memory devices to the master identification value.

Example 12 includes the subject matter of any of Examples 1-11, and wherein to set the selection identification value of each of the active non-volatile memory devices and the spare non-volatile memory device to the master identification value causes each of the active non-volatile memory devices and the spare non-volatile memory device to respond to the write command.

Example 13 includes the subject matter of any of Examples 1-12, and wherein to set the selection identification value comprises to set a selection identification value of each of the active non-volatile memory devices and the spare non-volatile memory device associated with the rank of active non-volatile memory devices to the master identification value if the last memory access command issued to the rank of active non-volatile memory devices was a read command.

Example 14 includes the subject matter of any of Examples 1-13, and wherein the memory controller is further to detect a failed non-volatile memory device of the rank of active non-volatile memory devices; migrate data from the failed non-volatile memory device to the spare non-volatile memory device associated with the rank of active non-volatile memory devices; and respond to future memory read requests to read the spare non-volatile memory device and each of the active non-volatile memory devices of the rank of active non-volatile memory devices except for the failed non-volatile memory device, wherein to read the spare non-volatile memory device comprises to not access the volatile memory device contemporaneously with the reading of the spare non-volatile memory device.

Example 15 includes the subject matter of any of Examples 1-14, and wherein the memory controller is further to set a master identification value of the failed non-volatile memory device to a unique value to cause the failed non-volatile memory device to not respond to future read or write commands form the memory controller.

Example 16 includes the subject matter of any of Examples 1-15, and further including a plurality of ranks of active non-volatile memory devices; and a plurality of spare non-volatile memory devices, wherein each spare non-volatile memory device is associated with a corresponding rank of active non-volatile memory devices.

Example 17 includes a method for accessing memory devices of a memory module device, the method comprising receiving, by a memory controller of the memory module device, a memory read request from a host; reading, by the memory controller and via a data bus, a rank of active non-volatile memory devices of the memory module device in response to the memory read request; and accessing, by the memory controller, a volatile memory device of the memory module device contemporaneously with the reading of the rank of active non-volatile memory devices using a set of data bus lines of the data bus communicatively coupled to both the volatile memory device and a spare non-volatile memory device associated with the rank of active non-volatile memory devices.

Example 18 includes the subject matter of Example 17, and wherein reading the rank of active non-volatile memory devices comprises reading the rank of active non-volatile memory devices while not reading the spare non-volatile memory device associated with the rank of active non-volatile memory devices.

Example 19 includes the subject matter of any of Examples 17 and 18, and wherein accessing the volatile memory device comprises reading from or writing to the volatile memory device of the memory module device.

Example 20 includes the subject matter of any of Examples 17-19, and further including setting an assignable identification value of each of the active non-volatile memory devices of the rank of active non-volatile memory devices to a common value; and setting an assignable identification value of the volatile memory device to a unique value.

Example 21 includes the subject matter of any of Examples 17-20, and wherein reading the rank of active non-volatile memory devices comprises setting a selection identification value of each of the active non-volatile memory devices and the spare non-volatile memory device associated with the rank of active non-volatile memory devices to the common value.

Example 22 includes the subject matter of any of Examples 17-21, and wherein setting the selection identification value of each of the active non-volatile memory devices and the spare non-volatile memory device associated with the rank of active non-volatile memory devices to the common value causes each of the active non-volatile memory devices to respond to a read command and the spare non-volatile memory device to ignore the read command.

Example 23 includes the subject matter of any of Examples 17-22, and wherein setting the selection identification value comprises setting the selection identification value of each of the active non-volatile memory devices and the spare non-volatile memory device associated with the rank of active non-volatile memory devices to the common value if the last memory access command issued to the rank of active non-volatile memory devices was a write command.

Example 24 includes the subject matter of any of Examples 17-23, and wherein setting the assignable identification value of each of the active non-volatile memory devices comprises writing the common value to a mode register of each of the active non-volatile memory devices, and setting the assignable identification value of the volatile memory device comprises writing the unique value to a mode register of the volatile memory device.

Example 25 includes the subject matter of any of Examples 17-24, and further including receiving, by the memory controller, a memory write request from a host; and writing, by the memory controller, to the rank of active non-volatile memory devices and the spare non-volatile memory device associated with the rank of active non-volatile memory devices in response to the memory write request.

Example 26 includes the subject matter of any of Examples 17-25, and wherein writing to the rank of active non-volatile memory devices and the spare non-volatile memory device associated with the rank of active non-volatile memory devices comprises not accessing the volatile memory device contemporaneously with the writing to the rank of active non-volatile memory devices.

Example 27 includes the subject matter of any of Examples 17-26, and wherein each of the active non-volatile memory devices and the spare non-volatile memory device has a master identification value that is the same value, and wherein writing to the rank of active non-volatile memory devices and the spare non-volatile memory device comprises setting a selection identification value of each of the active non-volatile memory devices and the spare non-volatile memory device associated with the rank of active non-volatile memory devices to the master identification value.

Example 28 includes the subject matter of any of Examples 17-27, and wherein setting the selection identification value of each of the active non-volatile memory devices and the spare non-volatile memory device to the master identification value causes each of the active non-volatile memory devices and the spare non-volatile memory device to respond to the write command.

Example 29 includes the subject matter of any of Examples 17-28, and wherein setting the selection identification value comprises setting a selection identification value of each of the active non-volatile memory devices and the spare non-volatile memory device associated with the rank of active non-volatile memory devices to the master identification value if the last memory access command issued to the rank of active non-volatile memory devices was a read command.

Example 30 includes the subject matter of any of Examples 17-29, and further including detecting, by the memory controller, a failed non-volatile memory device of the rank of active non-volatile memory devices; migrating, by the memory controller, data from the failed non-volatile memory device to the spare non-volatile memory device associated with the rank of active non-volatile memory devices; and responding, by the memory controller, to future memory read requests by reading the spare non-volatile memory device and each of the active non-volatile memory devices of the rank of active non-volatile memory devices except for the failed non-volatile memory device, wherein reading the spare non-volatile memory device comprises not accessing the volatile memory device contemporaneously with the reading of the spare non-volatile memory device.

Example 31 includes the subject matter of any of Examples 17-30, and further including setting, by the memory controller, a master identification value of the failed non-volatile memory device to a unique value to cause the failed non-volatile memory device to not respond to future read or write commands form the memory controller.

Example 32 includes one or more machine-readable storage media comprising a plurality of instructions stored thereon that, when executed, cause a memory controller of a memory module device to perform the method of any of Examples 17-31.

Example 33 includes a memory module device for accessing memory, the memory module device comprising means for receiving a memory read request from a host; means for reading, via a data bus, a rank of active non-volatile memory devices of the memory module device in response to the memory read request; and means for accessing a volatile memory device of the memory module device contemporaneously with the reading of the rank of active non-volatile memory devices using a set of data bus lines of the data bus communicatively coupled to both the volatile memory device and a spare non-volatile memory device associated with the rank of active non-volatile memory devices.

Example 34 includes the subject matter of Example 33, and wherein the means for reading the rank of active non-volatile memory devices comprises means for reading the rank of active non-volatile memory devices while not reading the spare non-volatile memory device associated with the rank of active non-volatile memory devices.

Example 35 includes the subject matter of any of Examples 33 and 34, and wherein the means for accessing the volatile memory device comprises means for reading from or writing to the volatile memory device of the memory module device.

Example 36 includes the subject matter of any of Examples 33-35, and further including means for setting an assignable identification value of each of the active non-volatile memory devices of the rank of active non-volatile memory devices to a common value; and means for setting an assignable identification value of the volatile memory device to a unique value.

Example 37 includes the subject matter of any of Examples 33-36, and wherein the means for reading the rank of active non-volatile memory devices comprises means for setting a selection identification value of each of the active non-volatile memory devices and the spare non-volatile memory device associated with the rank of active non-volatile memory devices to the common value.

Example 38 includes the subject matter of any of Examples 33-37, and wherein the means for setting the selection identification value of each of the active non-volatile memory devices and the spare non-volatile memory device associated with the rank of active non-volatile memory devices to the common value causes each of the active non-volatile memory devices to respond to a read command and the spare non-volatile memory device to ignore the read command.

Example 39 includes the subject matter of any of Examples 33-38, and wherein the means for setting the selection identification value comprises means for setting the selection identification value of each of the active non-volatile memory devices and the spare non-volatile memory device associated with the rank of active non-volatile memory devices to the common value if the last memory access command issued to the rank of active non-volatile memory devices was a write command.

Example 40 includes the subject matter of any of Examples 33-39, and wherein the means for setting the assignable identification value of each of the active non-volatile memory devices comprises means for writing the common value to a mode register of each of the active non-volatile memory devices, and the means for setting the assignable identification value of the volatile memory device comprises means for writing the unique value to a mode register of the volatile memory device.

Example 41 includes the subject matter of any of Examples 33-40, and further including means for receiving a memory write request from a host; and means for writing to the rank of active non-volatile memory devices and the spare non-volatile memory device associated with the rank of active non-volatile memory devices in response to the memory write request.

Example 42 includes the subject matter of any of Examples 33-41, and wherein the means for writing to the rank of active non-volatile memory devices and the spare non-volatile memory device associated with the rank of active non-volatile memory devices comprises means for not accessing the volatile memory device contemporaneously with the writing to the rank of active non-volatile memory devices.

Example 43 includes the subject matter of any of Examples 33-42, and wherein each of the active non-volatile memory devices and the spare non-volatile memory device has a master identification value that is the same value, and wherein the means for writing to the rank of active non-volatile memory devices and the spare non-volatile memory device comprises means for setting a selection identification value of each of the active non-volatile memory devices and the spare non-volatile memory device associated with the rank of active non-volatile memory devices to the master identification value.

Example 44 includes the subject matter of any of Examples 33-43, and wherein the means for setting the selection identification value of each of the active non-volatile memory devices and the spare non-volatile memory device to the master identification value causes each of the active non-volatile memory devices and the spare non-volatile memory device to respond to the write command.

Example 45 includes the subject matter of any of Examples 33-44, and wherein the means for setting the selection identification value comprises means for setting a selection identification value of each of the active non-volatile memory devices and the spare non-volatile memory device associated with the rank of active non-volatile memory devices to the master identification value if the last memory access command issued to the rank of active non-volatile memory devices was a read command.

Example 46 includes the subject matter of any of Examples 33-45, and further including means for detecting a failed non-volatile memory device of the rank of active non-volatile memory devices; means for migrating data from the failed non-volatile memory device to the spare non-volatile memory device associated with the rank of active non-volatile memory devices; and means for responding to future memory read requests by reading the spare non-volatile memory device and each of the active non-volatile memory devices of the rank of active non-volatile memory devices except for the failed non-volatile memory device, wherein the means for reading the spare non-volatile memory device comprises means for not accessing the volatile memory device contemporaneously with the reading of the spare non-volatile memory device.

Example 47 includes the subject matter of any of Examples 33-46, and further including means for setting a master identification value of the failed non-volatile memory device to a unique value to cause the failed non-volatile memory device to not respond to future read or write commands form the memory controller.

The invention claimed is:

1. A memory module device for accessing memory, the memory module device comprising:
 a rank of active non-volatile memory devices;
 a spare non-volatile memory device associated with the rank of active non-volatile memory devices;
 at least one volatile memory device; and
 a memory controller communicatively coupled to (i) the rank of active non-volatile memory devices via corresponding data bus lines of a data bus and (ii) to the spare non-volatile memory device and the volatile memory device by the same set of data bus lines of the data bus, and wherein the memory controller is to:
  set an assignable identification value of each of the active non-volatile memory devices of the rank of active non-volatile memory devices to a common value;
  set an assignable identification value of the volatile memory device to a unique value;
  receive a memory read request from a host;
  read, via the data bus, the rank of active non-volatile memory devices in response to the memory read request, wherein to read the rank of active non-volatile memory devices comprises to set a selection identification value of each of the active non-volatile memory devices and the spare non-volatile memory device associated with the rank of active non-volatile memory devices to the common value if the last memory access command issued to the rank of active non-volatile memory devices was a write command; and
  access, via the set of data bus lines, the volatile memory device contemporaneously with the read of the rank of active non-volatile memory devices.

2. The memory module device of claim 1, wherein to read the rank of active non-volatile memory devices comprises to read the rank of active non-volatile memory devices while the spare non-volatile memory device associated with the rank of active non-volatile memory devices is not read.

3. The memory module device of claim 1, wherein to: set the assignable identification value of each of the active non-volatile memory devices comprises to write the common value to a mode register of each of the active non-volatile memory devices, and set the assignable identification value of the volatile memory device comprises to write the unique value to a mode register of the volatile memory device.

4. The memory module device of claim 1, wherein the memory controller is further to:
 receive a memory write request from a host; and
 write to the rank of active non-volatile memory devices and the spare non-volatile memory device associated with the rank of active non-volatile memory devices in response to the memory write request.

5. The memory module device of claim 4, wherein each of the active non-volatile memory devices and the spare non-volatile memory device has a master identification value that is the same value, and
 wherein to write to the rank of active non-volatile memory devices and the spare non-volatile memory device comprises to set a selection identification value of each of the active non-volatile memory devices and the spare non-volatile memory device associated with the rank of active non-volatile memory devices to the master identification value.

6. The memory module device of claim 1, wherein the memory controller is further to:
 detect a failed non-volatile memory device of the rank of active non-volatile memory devices;
 migrate data from the failed non-volatile memory device to the spare non-volatile memory device associated with the rank of active non-volatile memory devices; and
 respond to future memory read requests to read the spare non-volatile memory device and each of the active non-volatile memory devices of the rank of active non-volatile memory devices except for the failed non-volatile memory device,
 wherein to read the spare non-volatile memory device comprises to not access the volatile memory device contemporaneously with the reading of the spare non-volatile memory device.

7. A method for accessing memory devices of a memory module device, the method comprising:
 setting an assignable identification value of each active non-volatile memory devices of a rank of active non-volatile memory devices of the memory module device to a common value;
 setting an assignable identification value of a volatile memory device of the memory module to a unique value;
 receiving, by a memory controller of the memory module device, a memory read request from a host;
 reading, by the memory controller and via a data bus, the rank of the active non-volatile memory devices of the memory module device in response to the memory read request, wherein reading the rank of active non-volatile memory devices comprises setting the selection identification value of each of the active non-volatile memory devices and the spare non-volatile memory device associated with the rank of active non-volatile memory devices to the common value if the last memory access command issued to the rank of active non-volatile memory devices was a write command; and
 accessing, by the memory controller, a volatile memory device of the memory module device contemporaneously with the reading of the rank of active non-volatile memory devices using a set of data bus lines of the data bus communicatively coupled to both the volatile memory device and a spare non-volatile memory device associated with the rank of active non-volatile memory devices.

8. The method of claim 7, wherein reading the rank of active non-volatile memory devices comprises reading the rank of active non-volatile memory devices while not reading the spare non-volatile memory device associated with the rank of active non-volatile memory devices.

9. The method of claim 7, further comprising:
 receiving, by the memory controller, a memory write request from a host; and
 writing, by the memory controller, to the rank of active non-volatile memory devices and the spare non-volatile memory device associated with the rank of active non-volatile memory devices in response to the memory write request.

10. The method of claim 9, wherein each of the active non-volatile memory devices and the spare non-volatile memory device has a master identification value that is the same value, and
 wherein writing to the rank of active non-volatile memory devices and the spare non-volatile memory device comprises setting a selection identification value of each of the active non-volatile memory devices and the spare non-volatile memory device associated with the rank of active non-volatile memory devices to the master identification value.

11. The method of claim 7, further comprising:
detecting, by the memory controller, a failed non-volatile memory device of the rank of active non-volatile memory devices;
migrating, by the memory controller, data from the failed non-volatile memory device to the spare non-volatile memory device associated with the rank of active non-volatile memory devices; and
responding, by the memory controller, to future memory read requests by reading the spare non-volatile memory device and each of the active non-volatile memory devices of the rank of active non-volatile memory devices except for the failed non-volatile memory device,
wherein reading the spare non-volatile memory device comprises not accessing the volatile memory device contemporaneously with the reading of the spare non-volatile memory device.

12. One or more non-transitory, machine-readable storage media comprising a plurality of instructions stored thereon that, when executed, cause a memory controller of a memory module device to:
set an assignable identification value of each active non-volatile memory devices of a rank of active non-volatile memory devices of the memory module device to a common value;
set an assignable identification value of a volatile memory device of the memory module device to a unique value;
receive, by a memory controller of the memory module device, a memory read request from a host;
read, by the memory controller and via a data bus, the rank of the active non-volatile memory devices of the memory module device in response to the memory read request, wherein to read the rank of active non-volatile memory devices comprises to set the selection identification value of each of the active non-volatile memory devices and the spare non-volatile memory device associated with the rank of active non-volatile memory devices to the common value if the last memory access command issued to the rank of active non-volatile memory devices was a write command; and
access, by the memory controller, a volatile memory device of the memory module device contemporaneously with the reading of the rank of active non-volatile memory devices using a set of data bus lines of the data bus communicatively coupled to both the volatile memory device and a spare non-volatile memory device associated with the rank of active non-volatile memory devices.

13. The one or more non-transitory, machine-readable storage media of claim 12, wherein to read the rank of active non-volatile memory devices comprises to read the rank of active non-volatile memory devices while not reading the spare non-volatile memory device associated with the rank of active non-volatile memory devices.

14. The one or more non-transitory, machine-readable storage media of claim 12, wherein the plurality of instructions, when executed, further cause the memory controller to:
receive, by the memory controller, a memory write request from a host; and
write, by the memory controller, to the rank of active non-volatile memory devices and the spare non-volatile memory device associated with the rank of active non-volatile memory devices in response to the memory write request.

15. The one or more non-transitory, machine-readable storage media of claim 14, wherein each of the active non-volatile memory devices and the spare non-volatile memory device has a master identification value that is the same value, and
wherein to write to the rank of active non-volatile memory devices and the spare non-volatile memory device comprises to set a selection identification value of each of the active non-volatile memory devices and the spare non-volatile memory device associated with the rank of active non-volatile memory devices to the master identification value.

16. The one or more non-transitory, machine-readable storage media of claim 12, wherein the plurality of instructions, when executed, further cause the memory controller to:
detect, by the memory controller, a failed non-volatile memory device of the rank of active non-volatile memory devices;
migrate, by the memory controller, data from the failed non-volatile memory device to the spare non-volatile memory device associated with the rank of active non-volatile memory devices; and
respond, by the memory controller, to future memory read requests by reading the spare non-volatile memory device and each of the active non-volatile memory devices of the rank of active non-volatile memory devices except for the failed non-volatile memory device,
wherein to read the spare non-volatile memory device comprises to not access the volatile memory device contemporaneously with the reading of the spare non-volatile memory device.

* * * * *